United States Patent
Huang

(10) Patent No.: US 8,272,617 B2
(45) Date of Patent: Sep. 25, 2012

(54) ADJUSTABLE SUPPORTING STAND

(76) Inventor: Ming-Hsien Huang, Taipei County (TW)

( * ) Notice: Subject to any disclaimer, the term of this patent is extended or adjusted under 35 U.S.C. 154(b) by 0 days.

(21) Appl. No.: 13/353,939

(22) Filed: Jan. 19, 2012

(65) Prior Publication Data

US 2012/0119050 A1 May 17, 2012

Related U.S. Application Data

(63) Continuation of application No. 12/905,151, filed on Oct. 15, 2010.

(30) Foreign Application Priority Data

Aug. 2, 2010 (TW) .................... 99125583 A

(51) Int. Cl.
*F16M 13/00* (2006.01)
(52) U.S. Cl. .............. 248/422; 248/917; 248/919
(58) Field of Classification Search ............ 248/422, 248/157, 161, 162.1, 404, 917, 919; 361/679.02, 361/679.06
See application file for complete search history.

(56) References Cited

U.S. PATENT DOCUMENTS

| | | | | |
|---|---|---|---|---|
| 6,659,417 B2* | 12/2003 | Hsieh | | 248/404 |
| 6,766,995 B1* | 7/2004 | Hsieh | | 248/404 |
| 7,198,240 B2* | 4/2007 | Chen | | 248/284.1 |
| 7,494,104 B2* | 2/2009 | Baek | | 248/372.1 |
| 7,628,371 B2* | 12/2009 | Gan et al. | | 248/422 |
| 7,810,773 B2* | 10/2010 | Chi | | 248/278.1 |
| 2005/0205725 A1* | 9/2005 | Yokouchi et al. | | 248/125.1 |
| 2006/0175476 A1* | 8/2006 | Hasegawa et al. | | 248/125.1 |
| 2008/0099637 A1* | 5/2008 | Pai | | 248/157 |
| 2008/0210841 A1* | 9/2008 | Tseng | | 248/422 |
| 2009/0179133 A1* | 7/2009 | Gan et al. | | 248/422 |

FOREIGN PATENT DOCUMENTS

EP 0183938 A1 6/1986

OTHER PUBLICATIONS

Communication From European Patent Office Citing the Above Referenced Patent References in a Counterpart Foreign Application Dated Mar. 29, 2012.
Communication From Korean Intellectual Property Office Citing US 2008/0210841 in a Counterpart Foreign Application Dated Apr. 24, 2012.

* cited by examiner

*Primary Examiner* — Ramon Ramirez
(74) *Attorney, Agent, or Firm* — Rosenberg, Klein & Lee

(57) ABSTRACT

An adjustable supporting stand includes a main body with a receiving room, a slidable module disposed in the receiving room, a supporting holder assembled on the slidable module, a gear set connected to the supporting holder, and an elastic member disposed on the main body. The gear set has at least one first gear and a second gear, and the first gear is smaller than the second gear. One end of the elastic member is fixed on the main body and another end of the elastic member is connected to the second gear.

12 Claims, 6 Drawing Sheets

ADJUSTABLE SUPPORTING STAND

CROSS REFERENCE TO RELATED APPLICATION

This application is a continuation application claiming only subject matter disclosed in prior application OF U.S. application Ser. No. 12/905,151 filed on Oct. 15, 2010 directed to 35 USC 120. The contents of all of which are incorporated herein their entirety.

BACKGROUND OF THE INVENTION

1. Field of the Invention

The instant disclosure relates to an adjustable supporting stand; in particular, an adjustable supporting stand characterized in reducing the elongation of the elastic member.

2. Description of Related Art

Monitor usually stands on a surface by a supporting stand. However, the traditional stand does not provide height adjustment and the user can not adjust the position of the monitor. Recently, adjustable supporting stand has been developed so that the user can change the monitor to a desired position or height to meet the requirement of user's view.

In the traditional adjustable stand structure, a movable member and a spring are used for adjusting the position of the monitor. The movable member can slide upward or downward on the stand. One end of the spring connects to a pivoting shaft of the stand and the other end connects to the movable member. The monitor is assembled to the movable member. The user can press the movable member so as to adjust the position of the monitor. When the user stop forcing the movable member, the monitor is set vertically by the balance between the weight of the monitor and the elastic force of the spring. For example, when the user forces to lift the monitor, the monitor can be lifted to a desired position. In other words, by using the cooperation of the movable member and the spring, the act of adjusting the monitor is achieved.

However, with the increasing weight and size of the monitor, the force provided by the spring is not enough to support the monitor. Furthermore, the elongation of the spring is equal to the moved distance of the monitor in the above mentioned structure, such that the elastic fatigue of the spring occurs easily with heavier monitor. As a result, the stand would fail to provide the adjusting function if the spring is broken.

Consequently, with regard to the resolution of defects illustrated hereinbefore, the inventors of the instant disclosure propose a reasonably and effectively designed solution for effectively eliminating such defects.

SUMMARY OF THE INVENTION

The objective of the instant disclosure is to provide an adjustable supporting stand having a gear set to reduce the elongation of the elastic member. Thus, the elastic member is protected from failure.

The objective of the instant disclosure is to provide a stepless and universal supporting stand.

To achieve the objective described as above, the instant disclosure discloses an adjustable supporting stand, which comprises: a main body; a slidable module disposed on the main body; a supporting holder mounted on the slidable module, wherein the supporting holder slides relatively to the main body; a gear set connected to the supporting holder, wherein the gear set has a first gear connected to the supporting holder and a fourth gear engaged with the first gear, and the first gear is smaller than the fourth gear; and an elastic member disposed on the main body, wherein the elastic member has a first end and a second end opposite thereof. The first end is adjustably fixed on the main body, and the second end is connected to the fourth gear.

In the instant disclosure, the smaller first gear turns because of the movement of the supporting holder. Simultaneously, the larger fourth gear is driven by the first gear. However, the fourth gear makes less revolution than the first gear. As a result, the elastic member which is forced to elongate by the turning of the fourth gear has a shorter elongation than the movement distance of the supporting holder. Thus, the elastic member is protected from elastic fatigue and the stand is prevented form failure.

In an exemplary embodiment, two such gear sets are provided. For example, a fourth gear makes less revolution than the first gear and a second gear makes less revolution than the third gear when the fourth gear is driving the third gear. Therefore, the elastic member which is forced to elongate by the turning of the second gear has an even shorter elongation than the movement distance of the supporting holder. Similarly, the elastic member is protected from elastic fatigue.

Accordingly, the elongation of the elastic member due to the sliding distance of the supporting holder is reduced. Therefore, the lifetime of the elastic member and the reliability of the adjustable supporting stand are improved.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1A:
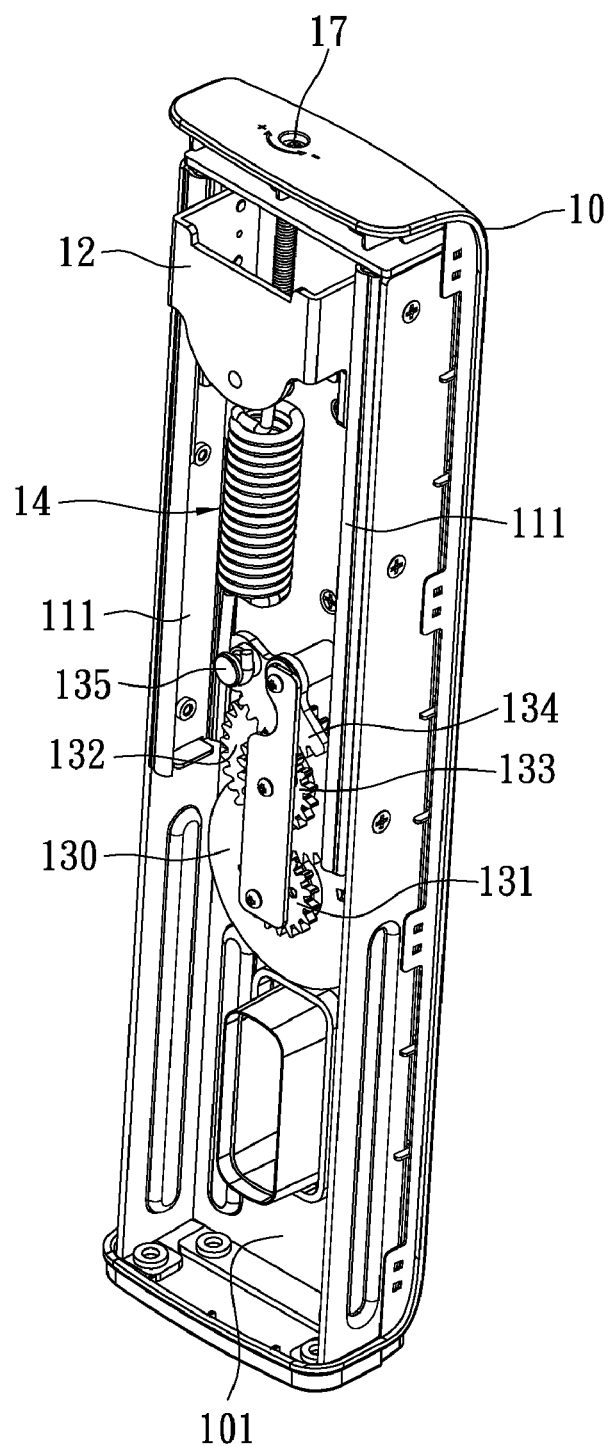
FIG. 1A is a structural diagram of the adjustable supporting stand at a home position according to the instant disclosure.
Figure 1B:
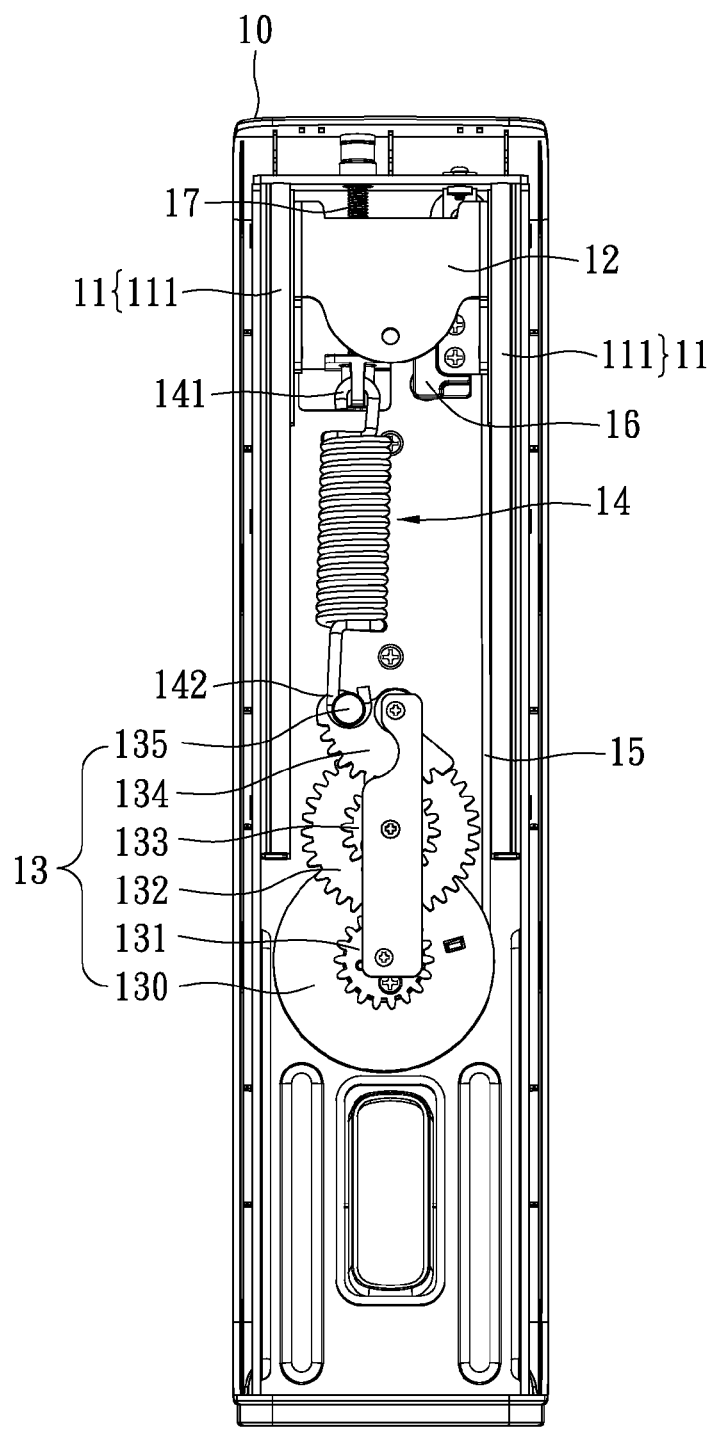
FIG. 1B is a front view of the adjustable supporting stand at a home position according to the instant disclosure.

The instant disclosure provides an adjustable supporting stand which may be used to adjust the position of a display device. The gear set and the elastic member of the adjustable supporting stand are used to move the display device. In the instant disclosure, the gear set includes a bigger gear and a smaller gear to reduce the elongation of the elastic member. Therefore, the elastic member is protected from failure and the lifetime of the supporting stand is increased.

Please refer to FIGS. 1A to 1B and FIGS. 2A to 2B. The adjustable supporting stand has a main body 10, a slidable module 11 disposed on the main body 10, a supporting holder 12 disposed on the slidable module 11, a gear set 13 connected to the supporting holder 12, and an elastic member 14 disposed on the main body 10. In the embodiment, the main body 10 has a receiving room 101 for accommodating the above components. For example, the slidable module 11 is mounted inside the main body 10, such that the slidable module 11 is received inside the receiving room 101. On the other hand, the gear set 13 and the elastic member 14 are also accommodated in the receiving room 101. The supporting holder 12 can be mounted on the slidable module 11. For example, the slidable module 11 can include at least two tracks 111 and the supporting holder 12 is slidable about the tracks 11. In other words, the supporting holder 12 can slide upward or downward by the function of the tracks 111. The supporting holder 12 is partially extended out of the receiving room 101, such that the display device or another device can be mounted or assembled to the supporting holder 12. In another embodiment, the slidable module 11 can include groove and slidable member. For example, the inner surface of the main body 10 can have grooves and two sides of the supporting holder 12 has corresponding slidable members, such that the supporting holder 12 slides along the grooves with the combination of the grooves and slidable members.

The gear set 13 and the elastic member 14 are constructed as a force module to force on the supporting holder 12. The gear set 13 connects to and moves with the supporting holder 12. The gear set 13 has at least one first gear 131 and one fourth gear 132 engaged with the first gear 131, and the first gear 131 is smaller than the fourth gear 132. The supporting holder 12 connects with the first gear 131 (i.e., a gear of smaller size). A first end 141 of the elastic member 14 is adjustably fixed on the main body 10, and a second end 142 of the elastic member 14 is connected to the fourth gear 132 (i.e., the gear of larger size). In the embodiment, when the supporting holder 12 slides downward, the first gear 131 and the fourth gear 132 of the gear set 13 rotate and simultaneously the elastic member 14 is extended. Because of the size difference of the first gear 131 and the fourth gear 132, the first rotated gear (i.e., the first gear 131) has longer rotation path than the second rotated gear (i.e., the fourth gear 132). Thus, the elastic member 14 which is forced to elongate by the fourth gear 132 with shorter rotation path has small elongation. Accordingly, the elastic member 14 elongates with shorter length than the traditional spring so that the elastic member 14 is protected from elastic fatigue.

In the embodiment, the first gear 131 is assembled on a turning plate 130, and the first gear 131 and the turning plate 130 rotate coaxially. A connection member 15, for example a rope, is connected in between the turning plate 130 and the supporting holder 12. When the supporting holder 12 slides downward, the connection member 15 is forced to elongate so that the turning plate 130, the first gear 131, and the fourth gear 132 rotate simultaneously because of the elongation of the connection member 15. As discussed above, the elongation of the elastic member 14 is reduced so as to protect the elastic member 14 due to the gear difference between the first gear 131 and the fourth gear 132. Please note that the turning plate 130 is used to carry the first gear 131 and engage to the connection member 15, but the shape or the structure of the turning plate 130 is not restricted thereby. On the other hand, the turning plate 130 and the first gear 131 may be integrally formed or be assembled with each other.

For further reducing the elongation of the elastic member 14, the gear set 13 may have a third gear 133 and a second gear 134. The third gear 133 is assembled on and rotates coaxially with the fourth gear 132. The second gear 134 is engaged with the third gear 133 and has a pivoting shaft 135 thereon, and the second end 142 of the elastic member 14 connects to the pivoting shaft 135. Moreover, the third gear 133 is smaller than the fourth gear 132 and the second gear 134 is larger than the third gear 133. Therefore, the movement distance of the supporting holder 12 is transmitted to the elastic member 14 through two sets of small gear and large gear (i.e., the first gear 131 and the fourth gear 132; the third gear 133 and the second gear 134) so that the elongation of the elastic member 14 is further reduced.

In an exemplary embodiment, the adjustable supporting stand of the instant disclosure can be assembled with a display screen. For example, the display screen is assembled on or screwed to the supporting holder 12 and the display screen can slide upward or downward because of the slidable module 11 so as to adjust the position thereof. The display screen can be hold at desired height due to the torque balance between a torque of a net force of display screen weight and friction, and a torque of the resilient force of the elastic member 14. In detail, the supporting holder 12 connects to the turning plate 130 via the rope (i.e., the connection member 15) and the rope may pass through a fixed pulley. While forcing on the display screen which is fixed on the supporting holder 12, the downward movement distance of the supporting holder 12 is transmitted in sequence to the rope, the turning plate 130 connected to the rope, the first gear 131 coaxially rotating with the turning plate 130, the fourth gear 132 engaged with the first gear 131, the third gear 133 coaxially rotating with the fourth gear 132, the second gear 134 and at last to the elastic member 14. Because of the gear ratio of the first and fourth gear 131 and 132 and the gear ratio of the third and forth gear 133 and 134, the elongation of the elastic member 14 is much less than the sliding distance of the supporting holder 12. In other words, the elastic member 14 is protected and has long lifetime due to the short elongation after being forced. When the user stops to force on the display screen, the torque applied by the net force of weight of the display screen and the friction force, and the torque applied by the elastic restoring force of the elastic member 14 are balanced so that the display screen is positioned on a predetermined height. In detail, the torque applied by the elastic restoring force of the elastic member 14 is a clockwise torque which is measured by computing the cross-product of the elastic restoring force vector and the radius vector of the second gear 134. The torque applied by the net force of weight of the display screen and the friction force is a counterclockwise torque which is measured by computing the cross-product of the net force vector and the radius vector of the turning plate 130. Using this mechanism of balancing torque, the display screen on the supporting holder 12 can be steplessly positioned in any desired position between the sliding ranges defined by the slidable module 11.

For lifting the display screen, the user may force on the display screen to slide the supporting holder 12 upward. The lifting force and the elastic restoring force of the elastic member 14 drive the display screen and the supporting holder 12 to move upward. When the user stops to force on the display screen, the display screen is positioned again.

On the other hand, for increasing the friction while the supporting holder 12 is sliding, the supporting holder 12 further has a friction member 16, such as rubber, and the friction member 16 may contact the inner surface of the main body 10. Therefore, the friction member 16 provides friction so as to improve the stability of the supporting holder 12.

The stand further has a torque-adjusting member 17 which is used to adjust the torque of the elastic member 14 for display devices of different sizes or weights; in other words, the instant stand is universal for display devices of different sizes or weights. In the exemplary embodiment, the torque-adjusting member 17 may be a screw disposed on the main body 10. The first end 141 of the elastic member 14 connects to the end of the screw; therefore, the position of the first end 141 of the elastic member 14 can be adjusted by changing the height of the end of the screw. As a result, the elastic member 14 may output different torques to apply for the display devices of different sizes or weights. While a heavier display screen is mounted on the supporting holder 12, the elastic member 14 has a elongation to apply larger torque to balance the torque of the display screen.

Figure 4:
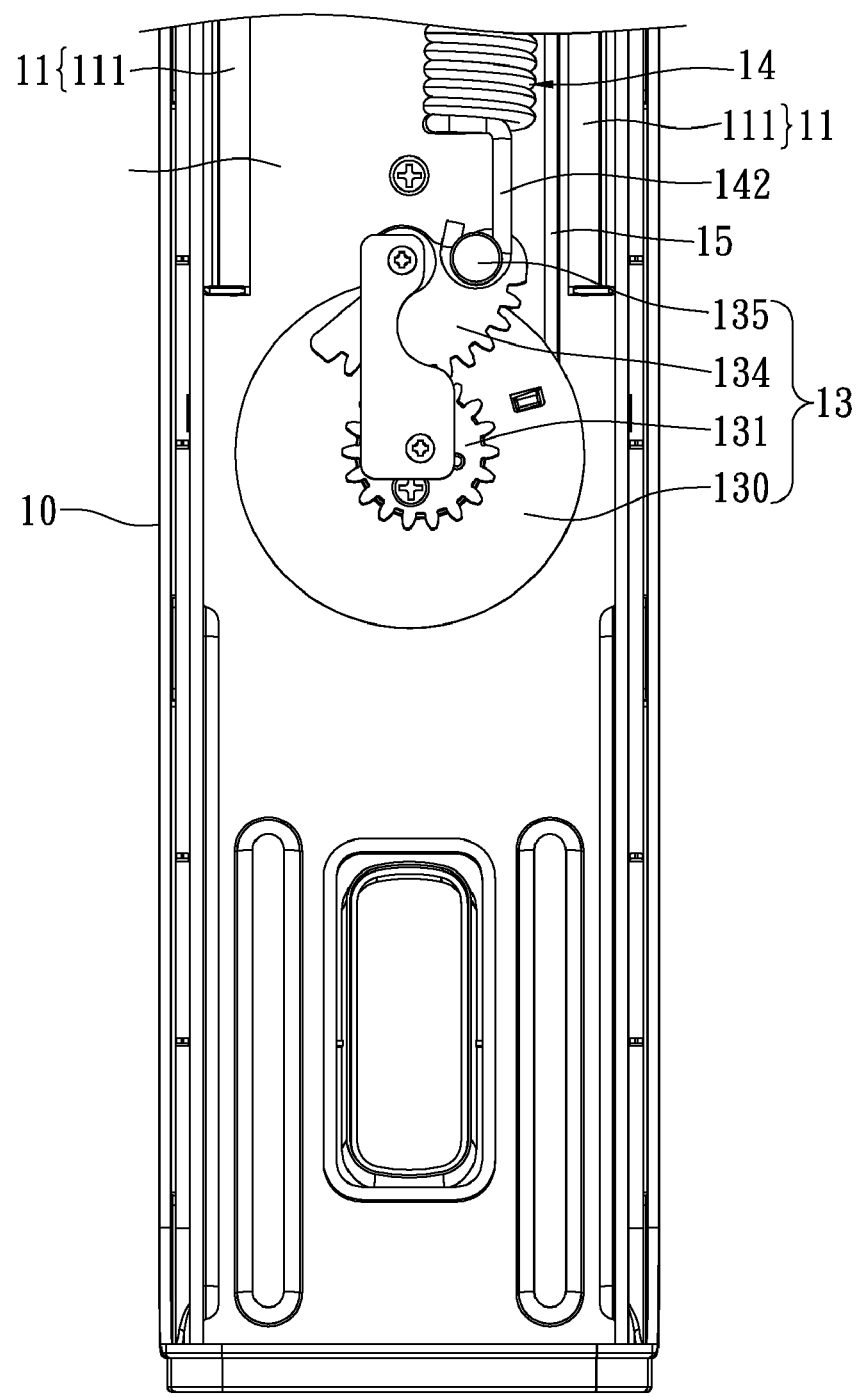
FIG. 4 is a front view of the adjustable supporting stand of a second embodiment according to the instant disclosure.

Please refer to FIG. 4; the smaller first gear 131 assembled on a turning plate 130 is directed engaged with the larger second gear 134 without the fourth gear 132 and the third gear 133. Thus, the elongation of the elastic member 14 is reduced so as to protect the elastic member 14 due to the gear difference between the first gear 131 and the second gear 134.

In further detail, when a display device of desired size/weight (e.g., a 32 inch LCD TV) is chosen by a user, the torque-adjusting member 17 may be used to adjust the position of the first end 141 of the elastic member 14 so as to elongate the elastic member 14. Thus, the elastic member 14 can provide a first resilient force. Please note that the second end 142, as shown in FIG. 1A, is located as the same horizontal level with the rotary shaft of the second gear 134. A first positive force arm vertical to the first resilient force is defined as a projection length of the radius of the second gear 134 (i.e., the length between the second end 142 and the rotary shaft of the second gear 134) on the horizontal axis and the first positive force arm is the greatest force arm while the second gear 134 rotating. When the display device is mounted on the supporting holder 12, a first torque by acting the first resilient force on the first positive force arm may be substantially equal to the torque by applying the net force of the weight of the mounted display device and the friction force on the horizontal radius of the turning plate 130. Therefore, the mounted display device on the supporting holder 12 can be retained at a first position (e.g., the highest position of the instant stand) due to the torque balance.

Figure 2A:
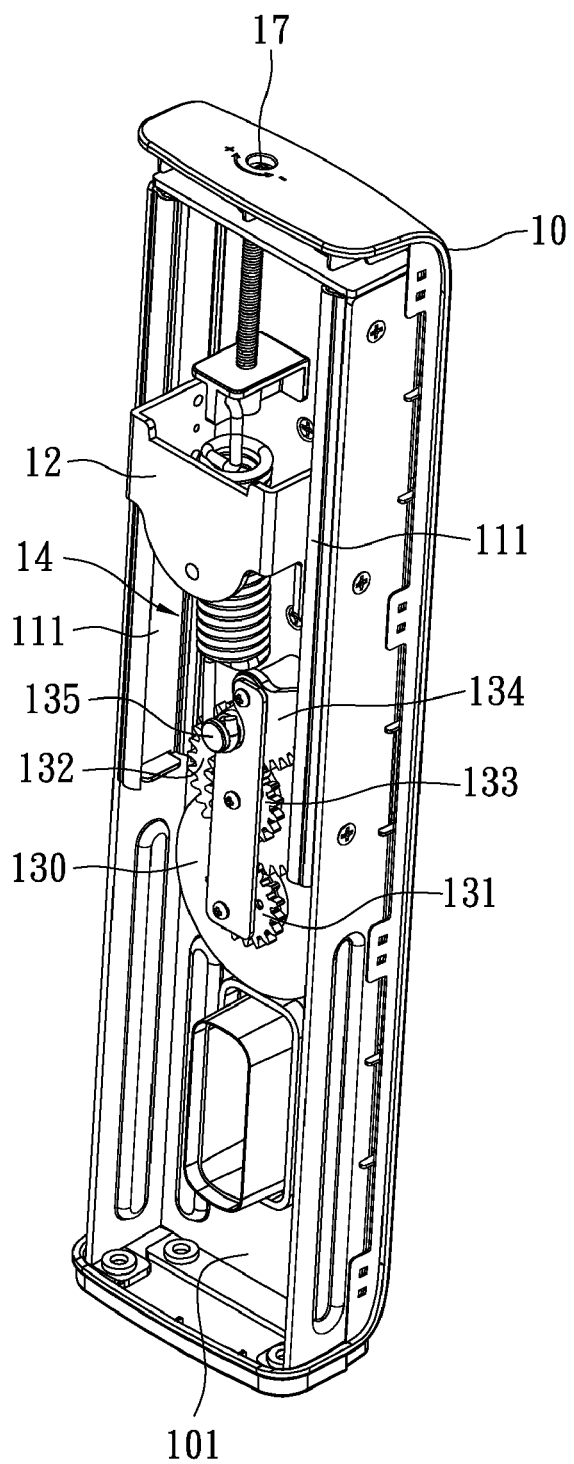
FIG. 2A is a structural diagram of the adjustable supporting stand at a second position according to the instant disclosure.
Figure 2B:
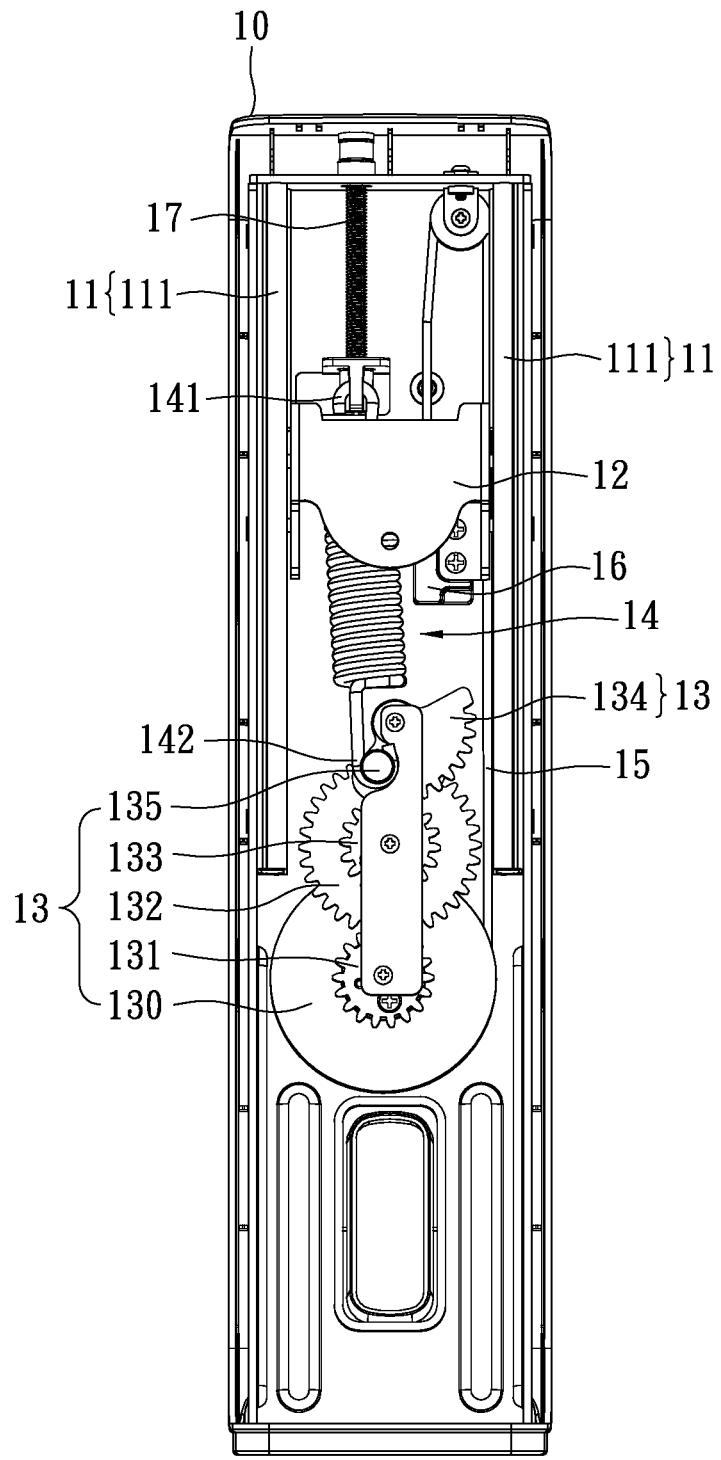
FIG. 2B is a front view of the adjustable supporting stand at a second position according to the instant disclosure.
Figure 3:
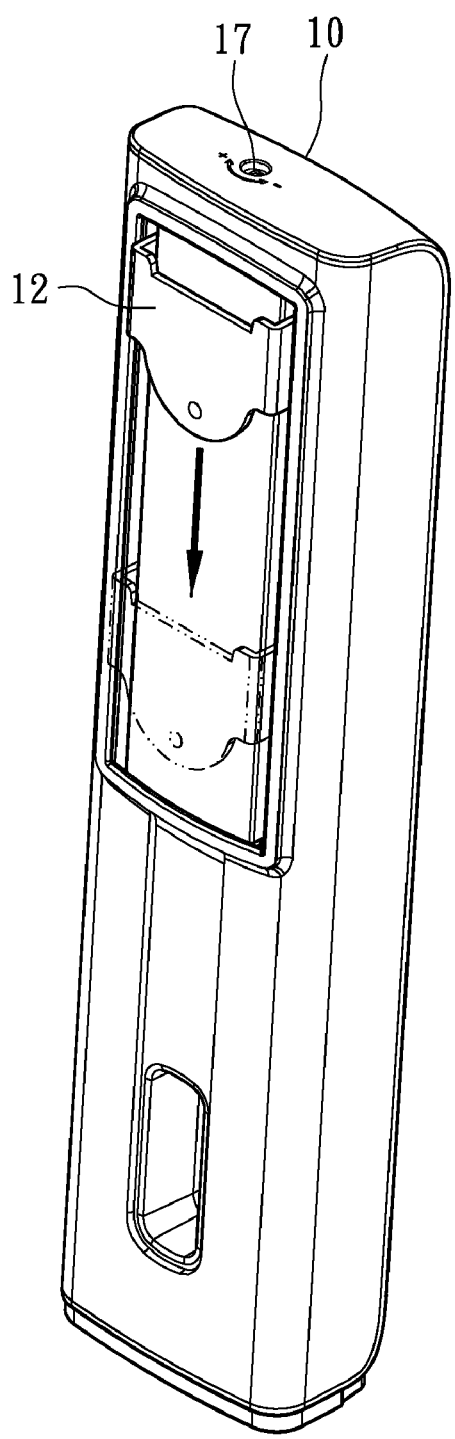
FIG. 3 is a structural diagram of the movement of the supporting holder according to the instant disclosure.

As shown in FIG. 2B, when the user polls down the mounted display device from the first position to a second position, the second end 142 of the elastic member 14 move toward the rotary shaft of the second gear 134 due to the counterclockwise rotation of the second gear 134. Accordingly, the elastic member 14 is further elongated and has a second resilient force. At this time, a second positive force arm vertical to the second resilient force, which is defined as a projection length of the radius of the second gear 134 (i.e., the length between the second end 142 and the rotary shaft of the second gear 134) on the horizontal axis, is reduced and smaller than the first positive force arm. That means the first positive force arm is the largest force arm, as the supporting holder 12 is located at the highest position. Therefore, a second torque by acting the second resilient force on the second positive force arm may be substantially equal to the torque by applying the net force of the weight of the mounted display device and the friction force on the horizontal radius of the turning plate 130. Please note that the friction force provided by the friction member 16 may be positive or negative signs with the weight of the mounted display device. In other words, although the elastic member 14 has a greater second resilient force, the shorter second positive force arm, which is resulted from the rotation of the sector gear 134, is used to compensate the greater resilient force. Accordingly, the positive torque provided by the elastic member 14 is still substantially equal to the torque by applying the net force of the weight of the mounted display device and the friction force on the horizontal radius of the turning plate 130 so that the position of the display device can be retained in a desired position.

In summary, the gear ratio (i.e., the relationship between the numbers of teeth on two gears or the relationship of between the circumferences of two gears) of the smaller gear (i.e., the first gear 131) and the larger gear (i.e., the fourth gear 132) is provided for reducing the turning revolution of the larger gear so that the elongation of the spring, which is connected to the larger gear, can be reduced. In other words, the driven larger gear has less turning revolution than the smaller gear. Therefore, when the force is transmitted to the spring, the elongation of the spring is shorter than the movement distance of the display screen and the supporting holder 12. As a result, the spring (i.e., the elastic member 14) can be protected. Furthermore, the instant disclosure provides a stepless stand due to the positive torque provided by the elastic member 14 is controlled and compensated equal to the weight of the mounted display device, and the mounted display device can be located at a desired position.

The description above only illustrates exemplary embodiments and examples of the instant disclosure. The instant disclosure should therefore cover various modifications and variations made to the herein-described structure and operations of the instant disclosure, provided they fall within the scope of the instant disclosure as defined in the following appended claims.

What is claimed is:

1. An adjustable supporting stand, comprising:
   a main body;
   a slidable module disposed on the main body;
   a supporting holder, mounted on the slidable module, wherein the supporting holder slides relatively to the main body;
   a gear set, wherein the gear set has a first gear connected to the supporting holder and a second gear coupled to the first gear, the first gear is assembled on a turning plate; and
   an elastic member disposed on the main body, wherein the elastic member has opposite first end and second end, the first end is adjustably fixed on the main body, and the second end is connected to the second gear;
   when the slidable module is positioned in a first position, the elastic member has a first resilient force, and the second end is located as the same horizontal level with the rotary shaft of the second gear, the first resilient force is applied on a first positive force arm;
   when slidable module slides from the first position downwardly and is positioned in a second position, the elastic member has a second resilient force, and the second resilient force is applied on a second positive force arm, the second resilient force is greater than the first resilient force, the second positive force arm is smaller than the first positive force arm.

2. The adjustable supporting stand according to claim 1, wherein the first gear is smaller than the second gear, the first gear is smaller than the turning plate.

3. The adjustable supporting stand according to claim 2, wherein the supporting holder further has a friction member, and the friction member contacts an inner surface of the main body.

4. The adjustable supporting stand according to claim 2, further comprising a torque-adjusting member disposed on the main body, and the first end of the elastic member connects to the torque-adjusting member so as to adjust the torque of the elastic member.

5. The adjustable supporting stand according to claim 2, further comprising a connection member, wherein the connection member is connected in between the turning plate and the supporting holder.

6. The adjustable supporting stand according to claim 2, wherein the first gear and the turning plate rotate coaxially.

7. The adjustable supporting stand according to claim 2, wherein the slidable module includes two tracks, the supporting holder is slidably about the tracks.

8. The adjustable supporting stand according to claim 2, wherein at least one groove is defined by the slidable module and includes at least one slidable member, wherein the supporting holder slides along the groove.

9. The adjustable supporting stand according to claim 2, wherein the main body has a receiving room, and the slidable module, the gear set and the elastic member are accommodated in the receiving room, and the supporting holder extends partially outside the receiving room.

10. The adjustable supporting stand according to claim 2, further comprising a gear set having coaxially rotating fourth and third gears, wherein the second gear engages with the third gear, the fourth gear engages with the first gear, the first gear is smaller than the fourth gear, the third gear is smaller than the fourth gear.

11. The adjustable supporting stand according to claim 10, wherein the second gear is larger than the third gear.

12. The adjustable supporting stand according to claim 2, wherein the second gear has a pivoting shaft, and the second end of the elastic member connects to the pivoting shaft.

* * * * *